(12) United States Patent
Bergmann et al.

(10) Patent No.: US 9,614,259 B2
(45) Date of Patent: Apr. 4, 2017

(54) BATTERY WITH A THERMAL TRIPPING ELEMENT

(71) Applicants: Robert Bosch GmbH, Stuttgart (DE); Samsung SDI Co., Ltd., Yongin-si, Gyeonggi-do (KR)

(72) Inventors: Sven Bergmann, Stuttgart (DE); Gergely Galamb, Traunstein (DE); Stefan Ziegler, Remchingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 478 days.

(21) Appl. No.: 14/198,053

(22) Filed: Mar. 5, 2014

(65) Prior Publication Data

US 2014/0252850 A1  Sep. 11, 2014

(30) Foreign Application Priority Data

Mar. 11, 2013 (DE) ........................ 10 2013 204 073

(51) Int. Cl.
| | |
|---|---|
| *H01M 10/48* | (2006.01) |
| *B60L 11/18* | (2006.01) |
| *H01M 10/42* | (2006.01) |
| *B60L 3/00* | (2006.01) |
| *B60L 3/04* | (2006.01) |

(Continued)

(52) U.S. Cl.
CPC ......... *H01M 10/486* (2013.01); *B60L 3/0046* (2013.01); *B60L 3/04* (2013.01); *B60L 11/18* (2013.01); *B60L 11/187* (2013.01); *B60L 11/1864* (2013.01); *B60L 11/1879* (2013.01); *H01M 2/348* (2013.01); *H01M 10/425* (2013.01); *H01M 10/488* (2013.01); *B60L 2240/545* (2013.01); *H01M 10/0525* (2013.01); *H01M 10/482* (2013.01); *H01M 2200/10* (2013.01); *H01M 2220/20* (2013.01);

(Continued)

(58) Field of Classification Search
CPC .................................................. H01M 10/486
USPC ........................................................ 307/10.7
See application file for complete search history.

(56) References Cited

U.S. PATENT DOCUMENTS

| | | | |
|---|---|---|---|
| 1,437,752 A | 12/1922 | Gormley | |
| 2002/0140401 A1* | 10/2002 | Watanabe | ............... H01M 2/22 320/134 |
| 2004/0251743 A1* | 12/2004 | Sadowski | ........... B60R 16/0315 307/10.1 |

FOREIGN PATENT DOCUMENTS

| | | |
|---|---|---|
| CN | 102523762 A | 6/2012 |
| DE | 44 00 461 C1 | 1/1995 |

(Continued)

*Primary Examiner* — Joseph Chang
(74) *Attorney, Agent, or Firm* — Maginot, Moore & Beck LLP

(57) ABSTRACT

A battery includes a battery housing and also two connections configured to electrically conductively connect the battery to a load. The battery further includes a battery string which is positioned in the battery housing, and connects the two connections to one another. At least one battery cell is connected in series and/or in parallel with the battery string. The battery has at least one thermal tripping element which is positioned within the battery housing, and which is configured to trip when a predetermined first temperature is present in a region of the thermal tripping element, and therefore is configured to indicate a presence of this predetermined first temperature in the region of the thermal tripping element.

10 Claims, 1 Drawing Sheet

(51) Int. Cl.
*H01M 2/34* (2006.01)
*H01M 10/0525* (2010.01)

(52) U.S. Cl.
CPC ........ *Y02T 10/7005* (2013.01); *Y02T 10/7011* (2013.01); *Y02T 10/7061* (2013.01)

(56) References Cited

FOREIGN PATENT DOCUMENTS

| | | |
|---|---|---|
| DE | 10 2008 001 286 A1 | 10/2009 |
| DE | 10 2008 040 520 A1 | 1/2010 |
| DE | 10 2009 046 496 A1 | 5/2011 |
| DE | 10 2011 009 042 A1 | 7/2012 |
| JP | 2001-28840 A | 1/2001 |

* cited by examiner

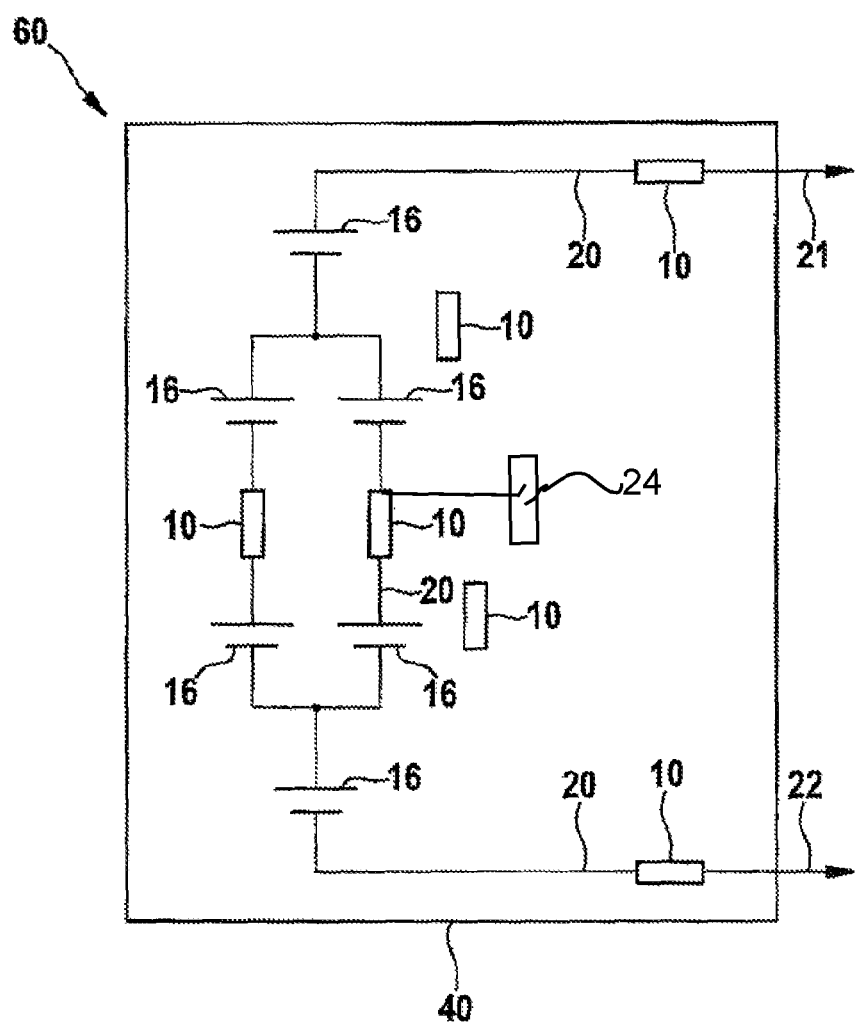

BATTERY WITH A THERMAL TRIPPING ELEMENT

This application claims priority under 35 U.S.C. §119 to patent application no. DE 10 2013 204 073.3, filed on Mar. 11, 2013 in Germany, the disclosure of which is incorporated herein by reference in its entirety.

The present disclosure relates to a battery having a battery housing, which battery has at least one thermal tripping element which is arranged within the battery housing and which is designed to trip when a predetermined first temperature is present in the region of the thermal tripping element and therefore to indicate the presence of this predetermined first temperature in the region of the thermal tripping element.

BACKGROUND

A battery or an accumulator is used as the energy source in electrically driven vehicles. At present, batteries of this kind are often composed of a large number of lithium-ion battery cells since, in the current prior art, these have the greatest energy density at the lowest weight, for example in comparison to nickel- or lead-based accumulators. Particular safety standards are to be complied with both in respect of production and also in respect of use of batteries of this kind on account of the high energy content, amongst other things. Disregard of said safety standards may damage or even destroy the battery cells of batteries of this kind. For example, charging the battery above a specific voltage limit and discharging the battery below a specific voltage limit can lead to destruction of the battery.

Furthermore, in particular, excessive charging or excess temperatures during operation of batteries within an electric vehicle present a risk to the battery and also to the safety of the user. This may result, for example, in so-called "venting", this being an uncontrolled, self-feeding reaction which can lead to evaporation of the electrolyte which is contained in the battery or to the battery catching fire. For this reason, both the voltage of the battery cells and also the temperature of the battery cells are continuously monitored in the batteries of the prior art, for example with the aid of measurement chips and microcontrollers.

SUMMARY

The disclosure provides a battery which comprises a battery housing and also two connections by means of which the battery can be electrically conductively connected to a load. The battery further comprises a battery string which is arranged in the battery housing, connects the two connections to one another and also has at least one battery cell which is connected in series and/or in parallel with the battery string. According to the disclosure, the battery has at least one thermal tripping element which is arranged within the battery housing and which is designed to trip when a predetermined first temperature is present in the region of the thermal tripping element and therefore to indicate the presence of this predetermined first temperature in the region of the thermal tripping element.

The advantage of batteries which are designed according to the disclosure is the indication of excess temperatures within the battery housing by the thermal tripping element. If overheating occurs, for example on account of thermal runaway, within a battery according to the disclosure or within the battery housing of a battery according to the disclosure, the thermal tripping element trips when a predetermined first temperature is reached and therefore indicates the presence of this temperature in the immediate vicinity of the thermal tripping element. As a result, it is possible, for example, for measures which disconnect the battery when excess temperatures are present within the battery housing to be provided within batteries according to the disclosure, as a result of which the battery according to the disclosure is safer than the batteries of the prior art.

In a preferred embodiment, the thermal tripping element is designed to change its state when the predetermined first temperature is present in the region of the thermal tripping element, wherein a change in state of the thermal tripping element is directly visible to an external viewer of the thermal tripping element and/or is indicated to an external viewer. In this way, the thermal tripping element can be used, for example, as a monitoring element or as an indicator element for excess temperatures.

The thermal tripping element is preferably designed as a liquid-filled glass ampoule which is designed to break when the predetermined first temperature is present in the region of the thermal tripping element. In other words, the change in state of the thermal tripping element preferably corresponds to breaking of the liquid-filled glass ampoule. The liquid contained within the liquid-filled glass ampoule continuously expands upon heating or as the temperature rises. If overheating occurs, this leading to an increase in temperature in the region of the thermal tripping element, up to the predetermined first temperature, the tripping temperature of the thermal tripping element, the thermal tripping element trips and the liquid-filled glass ampoule breaks. Liquid-filled glass ampoules of this kind make it possible for excess temperatures to be indicated in a highly accurate and reliable manner. Furthermore, liquid-filled glass ampoules are extraordinarily stable, chemically resistant and have a high resistance to changes in temperature. They are resistant to corrosion and age only to a slight extent.

The thermal tripping element is preferably further designed to cause an interruption in the battery string, as a result of being tripped, when the predetermined first temperature is present in the region of the thermal tripping element. In other words, the thermal tripping element is designed to interrupt the battery string as a result of being tripped, wherein the battery string is interrupted in an indirect manner in the process, that is to say the thermal tripping element is not connected to the battery string. A battery which is designed in this way is safer than the prior art since operation of the battery when excess temperatures are present within the battery is interrupted, this interruption being caused by the thermal tripping element.

In a preferred embodiment, the battery further comprises an electrical interlock circuit, an interruption in said electrical interlock circuit causing an interruption in the battery string and said electrical interlock circuit being connected to the thermal tripping element, wherein tripping of the thermal tripping element causes an interruption in the interlock circuit. The interlock circuit preferably interrupts the battery string virtually at the same time as it itself is interrupted by the thermal tripping element when said thermal tripping element is tripped directly. Furthermore, when the thermal tripping element is tripped, the interlock circuit preferably forwards the information that the battery string is to be interrupted to a further element of the battery, said further element then interrupting the battery string, for example at one or more contactors which are incorporated within the battery string.

Furthermore, the battery preferably further has a thermal control circuit which is connected to the thermal tripping element and which is designed to cause an interruption in the battery string when the thermal tripping element is tripped. A significant increase in the safety of the battery in comparison to the prior art can also be achieved with a thermal control circuit of this kind. It is also possible for a large number of further thermal tripping elements, which, in respect of their position, can be distributed over the entire battery, to be connected to a thermal control circuit. In this case, the interruption in the battery string can be caused in a direct manner, that is to say performed directly by the thermal control circuit, or else only indirectly by the thermal control circuit when the thermal tripping element is tripped. Therefore, the thermal control circuit can be designed, for example, to forward the information that the battery string is to be interrupted, which information is provided by the thermal element being tripped, to a further element of the battery, said further element then interrupting the battery string. Forwarding can be performed, for example, at one or more contactors which are incorporated within the battery string.

In a preferred further development of one of the preceding embodiments, the liquid-filled glass ampoule has a switching function. Owing to the use of a liquid-filled glass ampoule of this kind, the battery is particularly well protected against overheating and against operation in the overheated state. The liquid contained within the liquid-filled glass ampoule continuously expands upon heating or as the temperature rises. If overheating occurs, this leading to an increase in temperature in the region of the thermal tripping element, up to the predetermined first temperature, the tripping temperature of the thermal tripping element, the thermal tripping element trips and the liquid-filled glass ampoule breaks. The electrical interruption of the battery string, for example by an interlock circuit which is connected to the thermal tripping element or a thermal control circuit, is caused in association with this. The battery string remains in this electrically interrupted state until the thermal tripping element is replaced. Furthermore, liquid-filled glass ampoules are extraordinarily stable, chemically resistant and have a high resistance to changes in temperature. They are resistant to corrosion and age only to a slight extent.

In a preferred further development of one of the preceding embodiments, the liquid-filled glass ampoule further comprises a spring element and tripping of the thermal tripping element corresponds to thermally induced bursting of the liquid-filled glass ampoule, and the switching function is exerted mechanically by means of the spring element when the thermal tripping element is tripped. The spring element is preferably designed as a mechanical spring which mechanically establishes an electrical contact when the liquid-filled glass ampoule is in the intact state and which interrupts this electrical contact when the liquid-filled glass ampoule is in the tripped or burst state.

The battery preferably comprises at least one further thermal tripping element which is arranged within the battery housing and which is designed to change its state when a further predetermined first temperature is present. A further thermal tripping element of this kind, which does not have to have a switching function either, can be used, for example, for additional monitoring in combination with the thermal tripping element.

In a preferred further development of this embodiment, the predetermined first temperature is not equal to the further predetermined first temperature. If the predetermined first temperature is selected to be greater than or less than the further predetermined first temperature, the thermal tripping element and the further thermal tripping element trip at different temperatures. As a result, it is possible to ascertain, for example, which temperature values have been reached, or which temperatures have prevailed, within the battery or the battery housing.

Further preferably, the thermal tripping element and the further thermal tripping element are arranged directly next to one another. If the thermal tripping elements are arranged directly, that is to say immediately, next to one another, the maximum temperature which prevailed at the point of the arrangement within the battery housing for example during operation can, for example, be determined or limited.

The battery string preferably comprises battery cells of several battery modules.

The battery is preferably designed as a lithium-ion battery. Advantages of batteries of this kind include, amongst other things, their comparatively high energy density and their high degree of thermal stability. A further advantage of lithium-ion batteries is that they are not subject to a memory effect.

A motor vehicle having a battery according to the disclosure is further provided, wherein the battery is connected to a drive system of the motor vehicle.

Advantageous developments of the disclosure are specified in the claims and described in the description.

BRIEF DESCRIPTION OF THE DRAWINGS

Exemplary embodiments of the disclosure will be explained in greater detail with reference to the drawings and the following description. In the single FIGURE:

FIG. 1 shows an exemplary embodiment of a schematically illustrated battery according to the disclosure.

DETAILED DESCRIPTION

FIG. 1 shows an exemplary embodiment of a schematically illustrated battery 60 according to the disclosure. The battery 60 comprises a battery housing 40, which is only schematically illustrated in FIG. 1, and also two connections 21 and 22 by means of which the battery 60 can be electrically conductively connected to a load or to a high-voltage supply system or to the main contactors of a high-voltage supply system. A battery string 20 is arranged in the battery housing 40, said battery string connecting the two connections 21, 22 to one another and, in this exemplary embodiment, having a large number of battery cells 16, some of which are connected to the battery string 20 in series and others of which are connected to the battery string 20 and to further battery cells 16 in parallel. The battery string 20 is therefore an electrical connection between the connections 21 and 22 which, in this exemplary embodiment, has a large number of battery cells 16 which are connected to the electrical connection in series or in parallel. However, a battery 60 according to the disclosure does not have to have a large number of battery cells 16. It is also possible to produce batteries 60 according to the disclosure having battery strings 20 which have only one single battery cell 16 and to which, therefore, only a single battery cell 16 is connected in series or in parallel. In other words, in this exemplary embodiment, the battery 60 according to the disclosure has, purely by way of example, a large number of battery cells 16 which are connected in series or in parallel to an electrical path by means of which the connections 21 and 22 are connected to one another.

As already mentioned, FIG. 1 shows only a schematic interconnection of battery cells 16 to form a battery 60. The majority of batteries 60 according to the disclosure have a very high number of battery cells 16 which can optionally also form part of different battery modules. In this exemplary embodiment, the four battery cells 16, which are arranged in the center in a parallel circuit, of the six illustrated battery cells 16 form part of one battery module, whereas the remaining two battery cells 16, purely by way of example, each form part of a further and, respectively, another battery module, of which in each case only one battery cell 16 is illustrated. In this exemplary embodiment, the battery 60 has, purely by way of example, four thermal tripping elements 10 which are arranged within the battery housing 40 and which are designed to trip when a predetermined first temperature is present in the respective regions of the thermal tripping elements 10, and therefore to indicate the presence of this predetermined first temperature in the respective region of the respective thermal tripping elements, that is to say in the location where the thermal tripping elements 10 are arranged. In other words, the thermal tripping elements 10 are each designed to trip when a respectively predetermined first temperature is present in their respective, immediate vicinity and therefore to indicate the presence of the respective, predetermined first temperature in their respective immediate vicinity. In this exemplary embodiment, one of the thermal tripping elements 10 is arranged, purely by way of example, locally between the large number of battery cells 16, that is to say in front of the three battery modules and close to the connection 21, whereas another of the thermal tripping elements 10 is arranged locally between the large number of battery cells 16, that is to say behind the three battery modules and close to the remaining connection 22. In this case, the thermal tripping elements 10 are not electrically conductively connected to the battery string 20, but rather are arranged merely in the immediate vicinity of the battery string 20. In this exemplary embodiment, the two remaining thermal tripping elements 10 are arranged, purely by way of example, in the central battery module, wherein in each case one thermal tripping element 10 is arranged, purely by way of example, level with in each case one of the two branches of the parallel circuit, without being electrically conductively connected to the battery string 20. In other words, the two thermal tripping elements 10 which are arranged in the central battery module are arranged, purely by way of example, between the battery cells 16 of said central battery module. However, it is also possible to design batteries 60 according to the disclosure in which the thermal tripping elements 10 are arranged at another point within the battery housing 40. Purely by way of example, a thermal tripping element 10 can also be arranged locally between the battery cells 16 of two adjacent battery modules.

In this exemplary embodiment, the thermal tripping elements 10 are designed, purely by way of example, to each change their state when respectively predetermined first temperatures are present in the region of the respective thermal tripping elements 10, wherein the change in state of the thermal tripping elements 10 is directly visible to an external viewer of the thermal tripping element 10. In other words, in this exemplary embodiment, a user of the battery 60 according to the disclosure or an external viewer can see or identify a change in state of the thermal tripping element 10 with the naked eye, purely by way of example, after opening the battery housing 40 of the battery 60 according to the disclosure. However, it is also possible to design batteries 60 according to the disclosure in which an external viewer does not need to open the battery 60 in order to check the state of thermal tripping elements 10, or in which, as an alternative, tripping or a change in state of the thermal tripping element or elements 10 is indicated to an external viewer. This can be performed, for example, by means of a lamp or another warning indicator.

In this exemplary embodiment, the thermal tripping elements 10 are designed, purely by way of example, as liquid-filled glass ampoules which are designed to break when the predetermined first temperature is present in the respective region of the thermal tripping elements 10. However, it is also possible to design batteries 60 according to the disclosure with other thermal tripping elements 10. In this exemplary embodiment, said liquid-filled glass ampoules are, purely by way of example, liquid-filled glass ampoules produced by Norbulb. If the thermal tripping elements 10 are designed as liquid-filled glass ampoules, they can also be manufactured by other manufacturers and be designed differently to the above-described manner in other exemplary embodiments.

In this exemplary embodiment, the four thermal tripping elements 10 are designed, purely by way of example, to cause an interruption in the battery string 20, as a result of being tripped, when the predetermined first temperature is present in the respective region of the thermal tripping elements 10. In other words, for example, the thermal tripping element 10 which is arranged locally between the large number of battery cells 16, that is to say the thermal tripping element 10 which is arranged in front of the three battery modules and close to the connection 21, is designed to cause an interruption in the battery string 20 as soon as the temperature in the immediate vicinity of the thermal tripping element 10 has reached the predetermined temperature and has tripped the thermal tripping element 10. To this end, in this exemplary embodiment, the thermal tripping elements 10 are all, purely by way of example, electrically conductively connected to an interlock circuit 24 which, in this exemplary embodiment, is comprised, purely by way of example, by the battery 60 according to the disclosure. In this exemplary embodiment, an interruption in the interlock circuit 24 causes an interruption in the battery string 20, wherein tripping of one of the thermal tripping elements 10 causes an interruption in the interlock circuit 24. In this exemplary embodiment, the interlock circuit 24 is designed, purely by way of example, as a signal loop. However, it is also possible to design batteries 60 according to the disclosure in which the thermal tripping elements 10 are not connected to an interlock circuit 24, but rather to another system or element which can cause an interruption in the battery string 20 when one of the thermal tripping elements 10 is tripped. For example, batteries 60 according to the disclosure can also have a thermal control circuit to which the thermal tripping elements 10 are connected and which is designed to cause an interruption in the battery string 20 when the thermal tripping element 10 is tripped.

Furthermore, the thermal tripping elements 10 which are designed, purely by way of example, as liquid-filled glass ampoules in this exemplary embodiment each have, purely by way of example, a switching function. In this exemplary embodiment, this switching function is exerted, purely by way of example, by a spring element which is respectively comprised by the liquid-filled glass ampoules. In this exemplary embodiment, these spring elements are designed, purely by way of example, as mechanical springs which are in each case arranged in the liquid-filled glass ampoules and which, in the undamaged state, that is to say in the intact state of the liquid-filled glass ampoules, hold closed, purely by way of example, a contact in the interlock circuit 24. If the temperature in the immediate vicinity of one of the liquid-filled glass ampoules rises to the predetermined first temperature, that is to say the tripping temperature of the respective liquid-filled glass ampoule, this results in tripping, that is to say breaking or bursting of said glass ampoule. In this exemplary embodiment, the interlock circuit 24 is interrupted owing to the spring element within the respective liquid-filled glass ampoule, as a result of which an interruption in the battery string 20 is caused by the interlock circuit 24. However, it is also possible to produce batteries 60 according to the disclosure with thermal tripping elements 10 which are designed as liquid-filled glass ampoules and which do not contain a spring element and which are able to interrupt an interlock circuit 24 or thermal control circuit in some other way as a result of being tripped.

In this exemplary embodiment, the battery 60 according to the disclosure has, purely by way of example, two further thermal tripping elements 10 which are likewise arranged within the battery housing 40. These two further thermal tripping elements 10 are also each designed to change their state when a further predetermined first temperature is present. In this exemplary embodiment, the further predetermined first temperature, purely by way of example, does not correspond to the predetermined first temperature in this case. In this exemplary embodiment, the two further thermal tripping elements 10 are designed, purely by way of example, likewise as liquid-filled glass ampoules which, however, perform only an indication function, that is to say a monitoring function. In other words, the two further thermal tripping elements 10 each do not have, purely by way of example, a switching function.

In this exemplary embodiment, the top one of the further thermal tripping elements 10 in FIG. 1 has, purely by way of example, a further predetermined first temperature of 65° C., whereas the lower of the two further thermal tripping elements 10 in FIG. 1 has, purely by way of example, a further predetermined first temperature of 50° C. In this exemplary embodiment, the further predetermined first temperatures are therefore, purely by way of example, not equal to the predetermined first temperatures. However, it is also possible to design batteries 60 according to the disclosure in which the further predetermined first temperatures are equal to the predetermined first temperatures. Furthermore, it is also possible to design batteries 60 according to the disclosure with, for example, two further thermal tripping elements 10 which are arranged directly next to one another and have different further predetermined first temperatures from one another, said further thermal tripping elements changing their respective states when said further predetermined first temperatures are reached. It is further also possible to produce batteries 60 according to the disclosure in which more or less than four thermal tripping elements 10 or more or less than two further thermal tripping elements 10 are incorporated. Furthermore, it is also possible to design batteries 60 according to the disclosure with different predetermined first and/or further predetermined first temperatures to those described here.

What is claimed is:

1. A battery comprising:
   a battery housing;
   two connections configured to electrically conductively connect the battery to a load;
   a battery string positioned in the battery housing, wherein:
   the battery string connects the two connections to one another; and
   at least one battery cell is connected in at least one of (i) in series the battery string, and (ii) in parallel with the battery string; and
   at least one thermal tripping element positioned within the battery housing, and configured to:
   trip when a predetermined first temperature is present in a region of the at least one thermal tripping element; and
   indicate that the predetermined first temperature is present in the region of the at least one thermal tripping element when tripped,
   wherein the at least one thermal tripping element comprises a liquid-filled glass ampoule configured to break when the predetermined first temperature is present in the region of the at least one thermal tripping element.

2. The battery according to claim 1, wherein:
   a state of the at least one thermal tripping element is configured to change when the predetermined first temperature is present in the region of the at least one thermal tripping element; and
   at least one of:
   (i) a change in the state is directly visible to an external viewer of the thermal tripping element; and
   (ii) an indication of a change in the state is detectable by an external viewer of the thermal tripping element.

3. The battery according to claim 1, wherein the at least one thermal tripping element is further configured to cause an interruption in the battery string when tripped when the predetermined first temperature is present in the region of the at least one thermal tripping element.

4. The battery according to claim 3, further comprising:
   an electrical interlock circuit configured to cause an interruption in the battery string when the electrical interlock circuit is interrupted, wherein:
   the electrical interlock circuit is connected to the at least one thermal tripping element; and
   the at least one thermal tripping element is further configured to cause an interruption in the electrical interlock circuit when tripped.

5. The battery according to claim 3, further comprising a thermal control circuit connected to the at least one thermal tripping element, and configured to cause an interruption in the battery string when the at least one thermal tripping element is tripped.

6. The battery according to claim 1, wherein the liquid-filled glass ampoule has a switching function.

7. The battery according to claim 1, further comprising at least one further thermal tripping element positioned within the battery housing, wherein a state of the at least one further thermal tripping element is configured to change when a further predetermined first temperature is present.

8. The battery according to claim 7, wherein the predetermined first temperature is unequal to the further predetermined first temperature.

9. The battery according to claim 7, wherein the at least one thermal tripping element and the at least one further thermal tripping element are arranged next to one another.

10. A motor vehicle comprising:
    a battery connected to a drive system of the motor vehicle, and including:
    a battery housing;
    two connections configured to electrically conductively connect the battery to the drive system;
    a battery string positioned in the battery housing, wherein:
    the battery string connects the two connections to one another; and at least one battery cell is connected in at least one of (i) in series the battery string, and (ii) in parallel with the battery string; and at least one thermal tripping element positioned within the battery housing, and configured to:
trip when a predetermined first temperature is present in a region of the at least one thermal tripping element; and
indicate that the predetermined first temperature is present in the region of the at least one thermal tripping element when tripped,
wherein the at least one thermal tripping element comprises a liquid-filled glass ampoule configured to break when the predetermined first temperature is present in the region of the at least one thermal tripping element.

* * * * *